April 3, 1934.   G. R. HARRILD ET AL   1,953,558
BUN CUTTING MACHINE
Filed Nov. 6, 1930   2 Sheets-Sheet 1
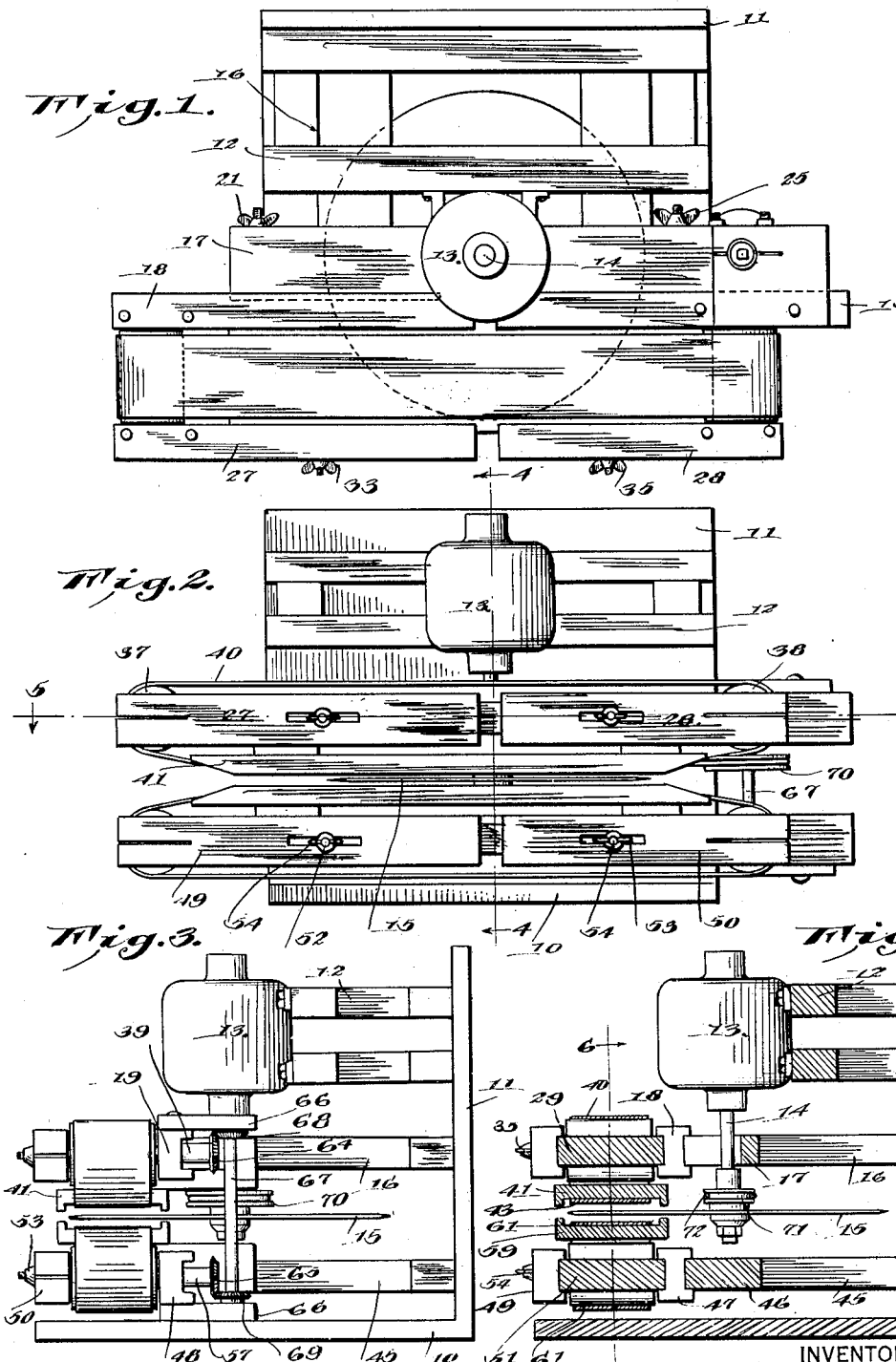

April 3, 1934.  G. R. HARRILD ET AL  1,953,558
BUN CUTTING MACHINE
Filed Nov. 6, 1930   2 Sheets-Sheet 2

WITNESS

INVENTORS
G. H. Harrild,
and Edward Crabbe,
BY
ATTORNEY

Patented Apr. 3, 1934

1,953,558

UNITED STATES PATENT OFFICE 1,953,558

BUN CUTTING MACHINE

Guildford R. Harrild and Edward Crabbe,
Yakima, Wash.

Application November 6, 1930, Serial No. 493,886

2 Claims. (Cl. 146—73)

Our invention relates to cutting machines and particularly to machines for cutting or slicing buns or rolls.

An object of the present invention is to provide a machine which will cut or slice the buns or rolls into halves of uniform thickness.

It is also an object of the invention to provide such a machine which automatically centers the buns relative to the cutter.

A further object of the invention is to provide a bun cutting machine including conveyors for automatically and expeditiously passing a large number of buns or rolls through the machine in a short time.

A still further object is to provide automatic means for feeding the buns to the cutter in a single layer.

It is a further object of the invention to provide a machine which will be strong and simple in construction, cheap to manufacture, and simple in operation and one in which the parts will be readily adjustable and not likely to become broken or to get out of order.

Other important objects will become apparent during the course of the following detailed description, when taken in conjunction with the accompanying drawings, which form a part of this application and in which:

Figure 1 is a top plan view of the device;

Fig. 2 is a side elevation thereof;

Fig. 3 is an end view thereof;

Fig. 4 is a sectional view taken on the line 4—4 of Fig. 2;

Figure 5:
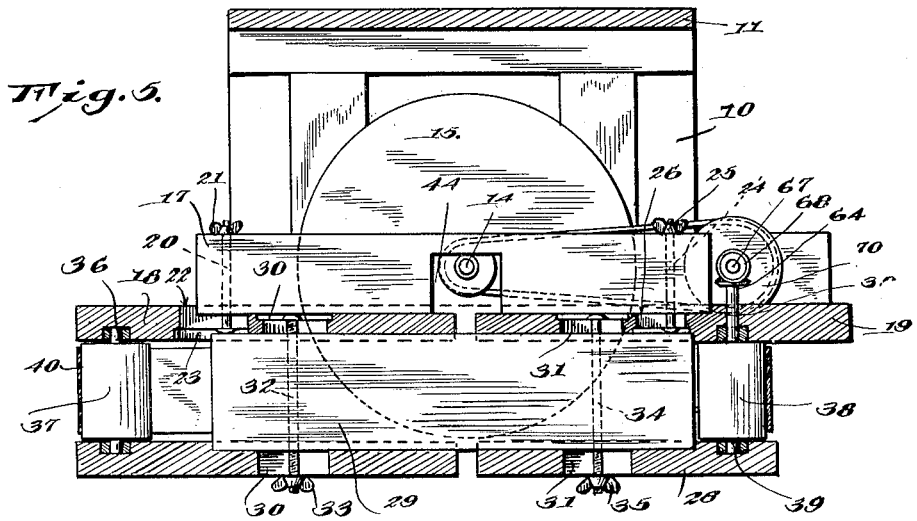
Fig. 5 is a sectional view taken on the line 5—5 of Fig. 2.
Figure 6:
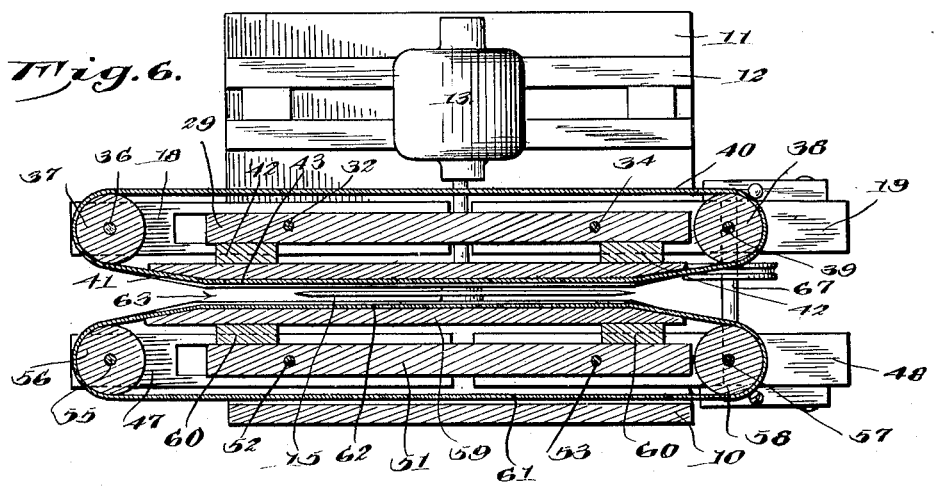
Fig. 6 is a sectional view taken on the line 6—6 of Fig. 4.

Referring now more particularly to the drawings, in which like numerals refer to like parts throughout the same, 10 indicates a base which is provided with a vertical supporting member 11 upstanding at one side thereof.

A motor support 12 is secured to the support 11 near the upper end thereof. The motor support 12 projects over the base 10 and has an elastic motor 13 secured to the projecting end thereof. The shaft 14 of the motor 13 projects downwardly and at substantially right angles to the base 10. A rotary knife 15 is secured to the motor shaft 14 adjacent the lower end thereof. The knife 15 is here shown as substantially circular in shape. The edge of the knife may be scalloped, wire edge, or formed with fine teeth as desired.

A horizontal supporting frame 16 projects from the support 11 so as to be spaced above the base 10 and project over said base. The longitudinal bar 17 of the frame 16 carries two arms 18 and 19. The arms 18 and 19 are slidably mounted on the forwardly projecting face of the bar 17 and each arm is channelled to form a seat and a sliding guide for engagement with the bar 17. The arm 18 is adjustably secured to the bar by means of a bolt 20 which passes entirely through the arm and bar and is provided with a wing nut 21. In order to provide for longitudinal movement of the arm 18, this arm is provided with a central horizontal slot 22 through which said bolt passes and the head of the bolt is accommodated in a recess 23 in the outer face of the arm 18.

It will thus be seen that by loosening the wing nut 21, the arm 18 can be moved longitudinally relative to the bar 17 a distance equal to the length of the slot 22.

The arm 19 is mounted on the bar 17 in the same manner as the bar 18, bolt 24 and wing nut 25 operating through horizontal slot 26 and through the bar 17 in the same manner as the bolt 20 to enable longitudinal adjustment of the arm 19.

The arms 18 and 19 are also channeled on their forward face and a pair of arms 27 and 28, somewhat similar to the arms 18 and 19 are channelled on their inner face and have this channel face directed toward the channel in the forward face of the arms 18 and 19, the two pairs of arms clamping between them a beam 29. The arms 18 and 27 and 19 and 28, respectively, are provided with central alined horizontal slots 30 and 31. A bolt 32 extends from the arm 18 through the slots 30 and passes through the beam 29 and is provided with a wing nut 33 whereby the arm 27 and beam 29 are clamped to the arm 18. The arm 28 and the other end of the beam 29 are secured to the arm 19 by means of a similar bolt 34 which passes through the slots 31 and beam 29 and is provided with a wing nut 35. By reason of the slots 30 and 31 the arms 18 and 27 may be moved longitudinally relative to the beam 29.

A shaft 36 is journaled between the arms 18 and 27 adjacent the projecting ends thereof, the shaft 36 providing a mounting for a roller 37. A similar roller 38 is mounted by means of the shaft 39 between the arms 19 and 28, also adjacent the ends thereof. An endless belt 40 is trained over the rollers 37 and 38. A longitudinally extending downwardly directed channel guide member 41 secured to the under face of the beam 29 by means of blocks 42, forms a guide for the bottom flight 43 of the endless conveyor belt 40. The channel guide 41 is upwardly bevelled at either end toward the rollers 37 and 38. The horizontal section of the channel 41 overlies a segment of the rotary knife 15 and the bottom flight 43 of the belt 40 travels over this channel member and is thereby disposed in confronting relationship to the rotary knife as will be readily seen from an inspection of the drawings. It will be noted that the bar 17 is provided with a cut out portion 44 for the accommodation of the motor shaft 14.

A frame 45 also projects from the upright support 11. This frame 45 is disposed below the frame 16 and slightly above the base 10. The frame 45 has a longitudinal bar 46 which supports arms 47 and 48 in the same manner as the arms 18 and 19 are supported by the bars 17. The arms 47 and 48 in turn support arms 49 and 50 and horizontal beam 51. The same being adjustably secured together by means of bolts 52 and 53 provided with wing nuts 54 in the same manner as described for the arms 18, 19, 27 and 28 and beam 29.

A shaft 55 is journalled between the arms 47 and 49 and provides a mounting for the roller 56. A similar shaft 57 providing a mounting for the roller 58 is journalled between the arms 48 and 50. An upwardly directed horizontal channel guide member 59 is mounted upon blocks 60 carried by the upper face of the beam 51 and has its ends bevelled toward the rollers 56 and 58. An endless belt 61 is trained over the rollers 56 and 58 and has its top flight 62 disposed in the channel of the guide member 59 and in confronting relationship to the rotary knife 15. It will thus be seen that a horizontal passage 63 is provided between guides 41 and 59 and belts 40 and 61. The rotary knife 15 operates medially of the confronting flights 43 and 62 of the conveyor belts 40 and 61.

The method of driving the belts 40 and 61 is best shown in Fig. 3. Each of the shafts 39 and 57 project through the arms 19 and 48 respectively and have bevelled gears 64 and 65 mounted on the respective ends thereof. A bearing plate 66 is carried by each of the arms 19 and 48 and the plates 66 mount between them a vertical shaft 67 provided with bevelled gears 68 and 69 which mesh with bevelled gears 64 and 65. A V-pulley 70 is secured to the shaft 67 and a second V-pulley 71 is secured to the motor shaft 14. A driving belt 72 trained over the pulleys 70 and 71 serves to drive the shaft 67 from the shaft 14 thereby driving shafts 39 and 57 through the bevel gears 68—64, and 69—65, respectively. The rollers 38 and 58 being keyed to their respective shafts will be driven therewith and rotation of the rollers will result in travel of the belts 40 and 61 as will be readily understood.

With the motor running and the device in operation buns or rolls are placed on the conveyor belt 61 between the rollers 37 and 56. The bun will then be fed between the channel guides 41 and 59 and past the rotating knife 15 and will be sliced into equal halves. The bun will be slightly compressed during its travel through the horizontal passage 63 and will be gripped top and bottom by the flights 43 and 62 of the respective conveyor belts. When it is desired to tighten or adjust the belts or rollers, it is necessary merely to loosen the correct wing nut to permit sliding adjustment of the desired arm or arms.

Figure 7:
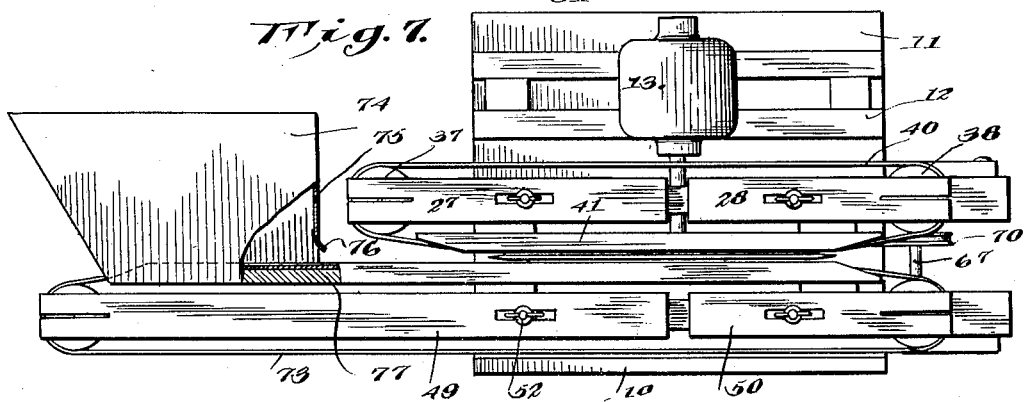
Fig. 7 is a side elevation, partly in section, of a modified form of the invention.

In the modified form shown in Fig. 7, an automatic feed for the buns or rolls is disclosed. In this form the general construction of the device is the same as in the other form except that the lower conveyor belt 73 is extended at the feeding end of the device and a hopper 74 is situated over the projecting end thereof. The hopper 74 may be filled with buns or rolls which are to be sliced by the machine. The hopper 74 is provided with a forward wall 75 which is provided with a lip 76 spaced above the top flight 77 of the conveyor belt 73. The distance between the lip 76 and flight 77 should be just great enough to permit the passage of a bun between the same when the bun is lying flat upon the conveyor. It will thus be seen that if a large number of buns or rolls are placed in the hopper 74 they will automatically be successively fed to the slicing machine due to the fact that only a single bun can pass between the lip 76 and conveyor belt at one time.

Although a preferred embodiment of the invention has been shown and described, it will be understood that various changes in the details of construction may be made without departing from the spirit of the invention as defined by the appended claims.

We claim:

1. In a bun cutting machine, an upstanding support, a pair of vertically spaced frame elements carried thereby, each of said frame elements including a longitudinally extending beam, pairs of arms engaging the sides of said beam adjacent each end thereof, said arms having channel grooves in the opposed faces thereof for engaging the sides of the beam and having their ends extended beyond the ends of the beam, a roller journalled between the extended ends of the arms of each pairs, endless conveyor elements trained over the rollers carried by the arms of each frame element, and a knife operating between said frame elements and said conveyors.

2. In a bun cutting machine, an upstanding support, a pair of vertically spaced frame elements carried thereby, each of said frame elements including a longitudinally extending beam, pairs of arms engaging the sides of said beam adjacent each end thereof, said arms having channel grooves in the opposed faces thereof for engaging the sides of the beam and having their ends extended beyond the ends of the beam, a roller journalled between the extended ends of the arms of each pair, endless conveyor elements trained over the rollers carried by the arms of each frame element, means for adjustably securing said arms to said beam for permitting longitudinal movement thereof to vary the distance between said rollers, and a knife operating between said frame elements and conveyors.

GUILDFORD R. HARRILD.
EDWARD CRABBE.